(12) United States Patent
Nomura et al.

(10) Patent No.: US 10,040,407 B2
(45) Date of Patent: Aug. 7, 2018

(54) INTERIOR MATERIAL FOR VEHICLE

(71) Applicant: KASAI KOGYO CO., LTD., Kanagawa (JP)

(72) Inventors: Hiroki Nomura, Atsugi (JP); Kenichi Sudou, Atsugi (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 706 days.

(21) Appl. No.: 13/720,853

(22) Filed: Dec. 19, 2012

(65) Prior Publication Data

US 2013/0164528 A1    Jun. 27, 2013

(30) Foreign Application Priority Data

Dec. 21, 2011  (JP) ................................. 2011-279999
Jan. 26, 2012  (JP) ................................. 2012-13770
(Continued)

(51) Int. Cl.
*B60R 13/02* (2006.01)
*B32B 1/00* (2006.01)
(Continued)

(52) U.S. Cl.
CPC ............... *B60R 13/02* (2013.01); *B32B 1/00* (2013.01); *B32B 5/00* (2013.01); *B32B 5/022* (2013.01);
(Continued)

(58) Field of Classification Search
CPC .. B32B 1/00; B32B 5/00; B32B 5/022; B32B 5/024; B32B 5/245; B32B 5/26;
(Continued)

(56) References Cited

U.S. PATENT DOCUMENTS 4,616,456 A   10/1986 Parker
4,978,181 A   12/1990 Inanuma et al.
(Continued)

FOREIGN PATENT DOCUMENTS

EP    0 985 566 A2    3/2000
JP    S36-24408 U     9/1961
(Continued)

OTHER PUBLICATIONS

European Search Report dated Mar. 11, 2013.
(Continued)

*Primary Examiner* — Kevin R Kruer
(74) *Attorney, Agent, or Firm* — McGinn I.P. Law Group, PLLC

(57) ABSTRACT

An interior material 10 for vehicle, comprising: a base material layer 11; a first reinforcement layer 12 disposed on a surface of a vehicle interior side of the base material layer; a second reinforcement layer 13 disposed on a surface of a vehicle body side of the base material layer; a skin layer 14 disposed on a surface of the opposite side of the first reinforcement layer viewed from the base material layer; and a backside layer 15 disposed on a surface of the opposite side of the second reinforcement layer viewed from the base material layer, wherein the backside layer comprises a base layer 16 and a functional layer 15' disposed on at least one surface of the base layer to block an air flow to the vehicle body side from the vehicle interior, and/or to reflect infrared radiation from the exterior of the vehicle.

8 Claims, 11 Drawing Sheets

(30) Foreign Application Priority Data

| Mar. 2, 2012 | (JP) | 2012-46621 |
| May 28, 2012 | (JP) | 2012-121216 |
| Nov. 5, 2012 | (JP) | 2012-243551 |

(51) Int. Cl.
| | |
|---|---|
| *B32B 7/12* | (2006.01) |
| *B32B 5/26* | (2006.01) |
| *B32B 15/09* | (2006.01) |
| *B32B 5/00* | (2006.01) |
| *B32B 15/085* | (2006.01) |
| *B32B 5/24* | (2006.01) |
| *B32B 5/02* | (2006.01) |

(52) U.S. Cl.
CPC ............. *B32B 5/024* (2013.01); *B32B 5/245* (2013.01); *B32B 5/26* (2013.01); *B32B 7/12* (2013.01); *B32B 15/085* (2013.01); *B32B 15/09* (2013.01); *B60R 13/0225* (2013.01); *B32B 2255/02* (2013.01); *B32B 2255/205* (2013.01); *B32B 2307/412* (2013.01); *B32B 2307/416* (2013.01); *B32B 2605/003* (2013.01); *Y10T 428/265* (2015.01); *Y10T 428/31681* (2015.04); *Y10T 428/31692* (2015.04)

(58) Field of Classification Search
CPC ......... B32B 7/12; B32B 15/085; B32B 15/09; B32B 2255/02; B32B 2255/205; B32B 2307/416; B32B 2605/003; B60R 13/02; B60R 13/0225; Y10T 428/31681; Y10T 428/265; Y10T 428/31692
See application file for complete search history.

(56) References Cited

U.S. PATENT DOCUMENTS

| 6,706,370 B1 | 3/2004 | Ito et al. |
| 7,147,716 B1 | 12/2006 | Boukobza et al. |
| 2001/0009725 A1 | 7/2001 | Moriyama et al. |
| 2002/0005647 A1 | 1/2002 | Ito |
| 2004/0222671 A1 | 11/2004 | Nagayama et al. |
| 2004/0231914 A1 | 11/2004 | Thompson, Jr. et al. |
| 2012/0268810 A1 | 10/2012 | Ohmori et al. |

FOREIGN PATENT DOCUMENTS

| JP | S61-102347 A | 5/1986 |
| JP | S 63-000228 B | 1/1988 |
| JP | 64-11721 U | 1/1989 |
| JP | H01-156033 U | 6/1989 |
| JP | H11-180225 A | 7/1999 |
| JP | 2000-095037 A | 4/2000 |
| JP | 2000-318540 A | 11/2000 |
| JP | 2001-158306 A | 6/2001 |
| JP | 2001-165386 A | 6/2001 |
| JP | 2001-301539 A | 10/2001 |
| JP | 2002-046545 A | 2/2002 |
| JP | 2003-53758 A | 2/2003 |
| JP | 2003-237492 A | 8/2003 |
| JP | 2005-028926 A | 2/2005 |
| JP | 2006-347542 A | 12/2006 |
| JP | 2007-290438 A | 11/2007 |
| JP | 2008-62930 * | 3/2008 |
| JP | 2008-062930 * | 3/2008 |
| JP | 2008-62930 A | 3/2008 |
| JP | 4180210 B2 | 11/2008 |
| JP | 2009-073458 A | 4/2009 |
| JP | 2009-113513 A | 5/2009 |
| JP | 2009-126496 A | 6/2009 |
| JP | 2009-248862 A | 10/2009 |
| JP | WO2010-029861 A1 | 3/2010 |
| JP | 2010-208607 * | 9/2010 |
| JP | 2010-208607 A | 9/2010 |
| JP | 2011-104887 A | 6/2011 |
| JP | 2011-152843 A | 8/2011 |
| JP | 2012-86661 A | 5/2012 |
| WO | WO 00/27671 | 5/2000 |
| WO | WO 01/40025 A1 | 6/2001 |
| WO | WO 2006/007275 A1 | 1/2006 |

OTHER PUBLICATIONS

Japanese Office Action (to JP 2012-243551) dated Apr. 1, 2014 without English translation.
European Office Action dated Feb. 27, 2014.
Japanese Office Action (to JP 2012-013770) dated Feb. 28, 2014 without English translation.
Japanese Office Action dated Nov. 12, 2013, with English translation.
Japanese Office Action (to JP 2012-121216) dated Aug. 21, 2013 without English translation.
Japanese Office Action (to JP 2012-013770) dated Nov. 12, 2013 without English translation.
Japanese Office Action (to JP 2012-046621) dated Nov. 19, 2013 without English translation.
Japanese Office Action (to JP 2012-121216) dated Nov. 26, 2013 without English translation.
Mexican Office Action dated Jun. 17, 2014.
European Office Action dated Sep. 22, 2014 in Corresponding EP Patent Application No. 12/198,542.8.
Extended European Search Report dated Jan. 28, 2016.

* cited by examiner (a)

(b)

INTERIOR MATERIAL FOR VEHICLE

CROSS REFERENCE TO RELATED APPLICATIONS

This application claims the foreign priority benefit under Title 35, United States Code, § 119(a)-(d) of five Japanese Patent Applications No. 2011-279999 filed on Dec. 21, 2011, No. 2012-013770 filed on Jan. 26, 2012, No. 2012-046621 filed on Mar. 2, 2012, No. 2012-121216 filed on May 28, 2012 and No. 2012-243551 filed on Nov. 5, 2012, in the Japan Patent Office, the disclosures of which are herein incorporated by reference in its entirety.

TECHNICAL FIELD

The present invention relates to an interior material for vehicle, in particular, an interior material that is mounted on the inside of a door and a roof of a vehicle, for example.

BACKGROUND ART

Conventionally, as an interior material for vehicle, known is an interior material having a skin layer on an interior side of a base material layer, and having a backside layer on a vehicle body side of the base material layer.

For example, as shown in FIG. 19, an interior material 10 is formed by laminating a base material layer 11 in urethane, an interior side fiber layer 12 and a vehicle body side fiber layer 13 which are disposed so as to sandwich the base material layer 11, a skin layer 14 which is disposed on the surface of the interior side fiber layer 12 and forms a roof surface of the vehicle interior, and a backside layer 15 which is disposed on the backside of the vehicle body side fiber layer 13. Note that FIG. 19 shows a case where the backside layer 15 is placed at the top, and the skin layer 14 is placed at the bottom, corresponding to the direction of the interior material 10 to be mounted on the inside of a roof of a vehicle.

Among the above elements forming the interior material 10, the base material layer 11, the interior side fiber layer 12, the vehicle body side fiber layer 13 and the skin layer 14 are made of a breathable material generally. Therefore, by employing a non-breathable material for the backside layer 15, an air flow to the backside of the interior material 10 from the vehicle interior is stopped to prevent dust and the like from adhering to the surface of the skin layer 14.

The above described interior material 10 is manufactured by a manufacturing process as shown in FIG. 20. Note that FIG. 20 shows a case where the interior side skin layer 14 is placed at the top, and the vehicle body side backside layer 15 is placed at the bottom, corresponding to the direction of a molding material 10' which is prepared for molding.

First, as shown in FIG. 20a, the molding material 10' is prepared by laminating the base material layer 11, the vehicle interior side fiber layer 12, the vehicle body side fiber layer 13, the skin layer 14 and the backside layer 15. In advance, an adhesive 17 is applied over both the entire front and back surfaces of the vehicle interior side fiber layer 12 and the vehicle body side fiber layer 13 of the molding material 10'. Next, as shown in FIG. 20b, the molding material 10' is sandwiched between an upper die 41 and a lower die 42 and is hot-pressed. Here, a back surface of the skin layer 14 is adhered to a surface of the vehicle interior side fiber layer 12, and a front surface of the backside layer 15 is adhered to a back surface of the vehicle body side fiber layer 13. Thus, an interior material 10 with a predetermined shape is obtained by integrating all the layers, as shown in FIG. 19.

By the way, conventionally, as an automotive interior material, for example, that disclosed in Japanese Patent Application Laid-Open Publication No. 2001-158306 (Patent Literature 1) is known. Japanese Patent Application Laid-Open Publication No. 2001-158306 (Patent Literature 1) discloses an automotive interior material comprising a substrate (corresponding to the base material layer) which is composed of a core material made of a resin foam and a surface mounting material (corresponding to the skin layer) laminated to the interior side of the core material, and an infrared ray reflection layer. The infrared reflective layer is attached towards a roof panel of an automotive body. It is disclosed that if the infrared reflective layer is formed with an aluminum deposition sheet for example, heat is shielded by the sheet even if sunlight incidents on the roof panel. The aluminum deposition sheet is described as a sheet in which aluminum is deposited on a substrate layer such as a plastic.

However, in the interior material 10 applied to a vehicle roof, the backside layer 15 made of a non-breathable material was formed with an aluminum deposition film. The aluminum deposition film functioned as an infrared reflective film, and thereby heat from the roof panel side was shielded. However, in an environmental test, it was found that there was disadvantage that the aluminum deposited on a base film tended to peel off from the base. It is considered that a cause of such a phenomenon is attributed to the reduction of the adhesion strength of the aluminum deposited on the base film to the base film that was promoted in the environmental test, due to entering of sebum into pinholes or cracks in the aluminum deposition film, which would be generated at points of contact with operator's hands during aluminum depositing operation.

Further, the automotive interior material of Japanese Patent Application Laid-Open Publication No. 2001-158306 (Patent Literature 1) includes a layer having an infrared reflecting function, facing the roof panel of the automotive body. The layer having an infrared reflecting function has a light reflectance of 50~90% in a wavelength region of 350~2500 nm, and a thickness is set to 0.1 μm~1 mm. According to this, even if the heat from the sun may be transmitted on the automotive body, the heat is shielded by the layer having an infrared reflecting function. But this disclosure aims to reflect the infrared ray having the wavelength region of 350~2500 nm. It is not a technique to reflect a far infrared ray. In addition, there is no description on the relationship between the configuration of the infrared reflective layer and the heat shielding effect in Japanese Patent Application Laid-Open Publication No. 2001-158306 (Patent Literature 1). Sufficient study on the optimal configuration of the infrared reflective layer effective for far infrared ray and a technique that maximizes heat shield performance of the infrared reflective layer are desired.

Furthermore, a technology is known where an interior material is applied to a sunshade of a sunroof made of a transparent member disposed in a vehicle roof. Such a structure is disclosed in Japanese Patent Application Laid-Open Publication No. 2010-208607 (Patent Literature 2), for example. Here, a sunshade is laminated from a plurality of base material layers made of an urethane foam each, a first glass fiber reinforcement layer adhere between the plurality of base material layers, a second and a third glass fiber reinforcement layers adhered to outer sides of the plurality of base material layers each, a skin layer adhered to outer side of the second glass fiber reinforcement layer, and a backside layer adhered to outer side of the third glass fiber reinforcement layer. In Japanese Patent Application Laid-Open Publication No. 2010-208607 (Patent Literature 2), a material laminated with a blackish nonwoven fabric is disposed as a skin layer of the sunshade. But, a temperature of the heat insulating smoked glass of the sunroof grows higher gradually by the radiant heat of the sunlight, and heat is accumulated in the nonwoven fabric skin material of the facing sunshade by the radiant heat from the heat insulating smoked glass. As a result, there is a problem that the temperature control efficiency decreases in the vehicle interior.

SUMMARY OF INVENTION

Technical Problem

The present invention has been made based on such circumstances. The objective of the present invention is to provide an interior material for vehicle, blocking an air flow toward a vehicle body from a vehicle interior, and/or reflecting infrared radiation from the exterior, where composing layers are prevented from separating, moldability is good, molding cycle is shortened, increase of manufacturing costs is avoided, and comfortability in a vehicle is ensured by effectively controlling temperature rise.

Solution to Problem

The present invention can be understood by the following configuration. In a 1st aspect, an interior material for vehicle, comprising: a base material layer; a first reinforcement layer disposed on a surface of a vehicle interior side of the base material layer; a second reinforcement layer disposed on a surface of a vehicle body side of the base material layer; a skin layer disposed on a surface of the opposite side of the first reinforcement layer viewed from the base material layer; and a backside layer disposed on a surface of the opposite side of the second reinforcement layer viewed from the base material layer, wherein the backside layer comprises: a base layer; and a functional layer disposed on at least one surface of the base layer to block an air flow to the vehicle body side from the vehicle interior, and/or to reflect infrared radiation from the exterior of the vehicle.

In a 2nd aspect according to the 1st aspect, the backside layer may comprise the functional layer and the base layer in this order viewed from the second reinforcement layer.

In a 3rd aspect according to the 1st aspect, the backside layer may comprise the base layer and the functional layer in this order viewed from the second reinforcement layer.

In a 4th aspect according to the 1st aspect, the backside layer may comprise the one functional layer, the base layer and the other functional layer in this order viewed from the second reinforcement layer.

In a 5th aspect according to any one of the 1st to 4th aspects, the base layer may be formed from a resin film.

In a 6th aspect according to 5th aspect, the resin film may be formed from a polyester-based resin (PP) or a polypropylene-based resin (PET).

In a 7th aspect according to any one of the 1st to 4th aspects, the functional layer may be formed from an inorganic material.

In an 8th aspect according to the 7th aspect, the inorganic material may be an aluminum deposited on the base layer, or an aluminum foil laminated on the base layer.

In a 9th aspect according to any one of the 1st to 4th aspects, the base layer may have a thickness in a range of 0.8~25 μm.

In a 10th aspect according to any one of the 1st to 4th aspects, the functional layer may have a thickness in a range of 0.01~0.09 μm.

In an 11th aspect according to any one of the 1st to 4th aspects, the functional layer may have a light reflectance of 80% or more in a wavelength region of 4000~16000 nm.

In a 12th aspect according to any one of the 1st to 4th aspects, further comprised is an adhesive applied on both surfaces of each of the first and the second reinforcement layers, wherein the base material layer and the first reinforcement layer, the base material layer and the second reinforcement layer, the first reinforcement layer and the skin layer, and the second reinforcement layer and the backside layer are adhered, respectively.

Advantageous Effects of Invention

According to the aspects of the present invention, provided is an interior material for vehicle, blocking an air flow toward a vehicle body from a vehicle interior, and/or reflecting infrared radiation from the exterior, where composing layers are prevented from separating, moldability is good, molding cycle is shortened, increase of manufacturing costs is avoided, and comfortability in a vehicle is ensured by effectively controlling temperature rise.

BRIEF DESCRIPTION OF DRAWINGS

FIG. 10a is a cross-sectional view showing an example of a conventional aluminum deposition film, and FIG. 10b is a cross-sectional view of an interior material for vehicle having the aluminum deposition film.

DESCRIPTION OF EMBODIMENTS

Detailed description is given, referring to the attached drawings, on the preferred embodiments of the present invention (hereinafter, called 'embodiment(s)'). The same reference signs are assigned to the same elements throughout the description of the embodiments, but some positional relationship between a vehicle body side and an interior side is represented upside down by the embodiment. It should be noted that the positional relationship between the vehicle body side and the interior side is described corresponding to each embodiment.

Figure 1:
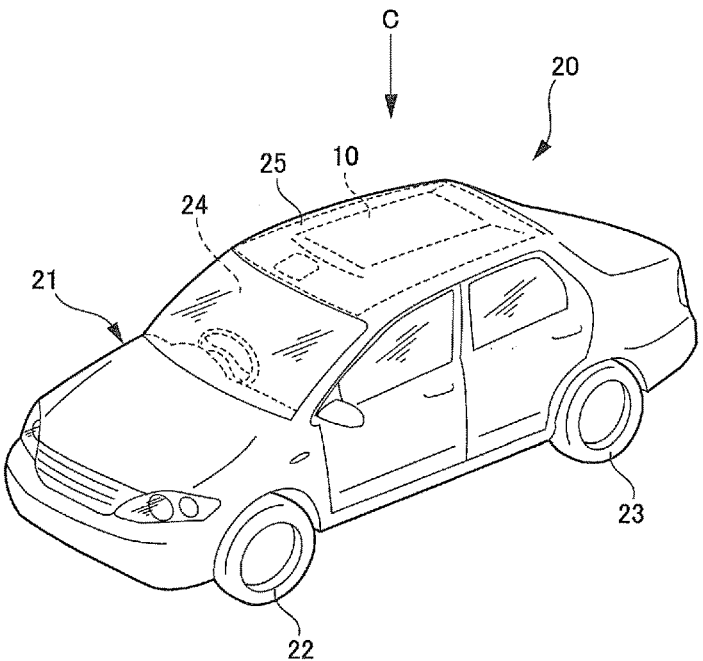
FIG. 1 is a perspective view showing a vehicle in which an interior material for vehicle according to the present invention is applied.

First, a description is made on a vehicle to which an interior material for vehicle of the present invention is applied. As shown in FIG. 1, a vehicle 20 comprises a vehicle body 21, front wheels 22, rear wheels 23, and a vehicle interior 24. The vehicle body 21 comprises a roof 25 which covers the upper side of the vehicle interior 24, and the inner side of the roof 25 is disposed with an interior material for vehicle 10 which furnishes the roof surface.

Figure 2:
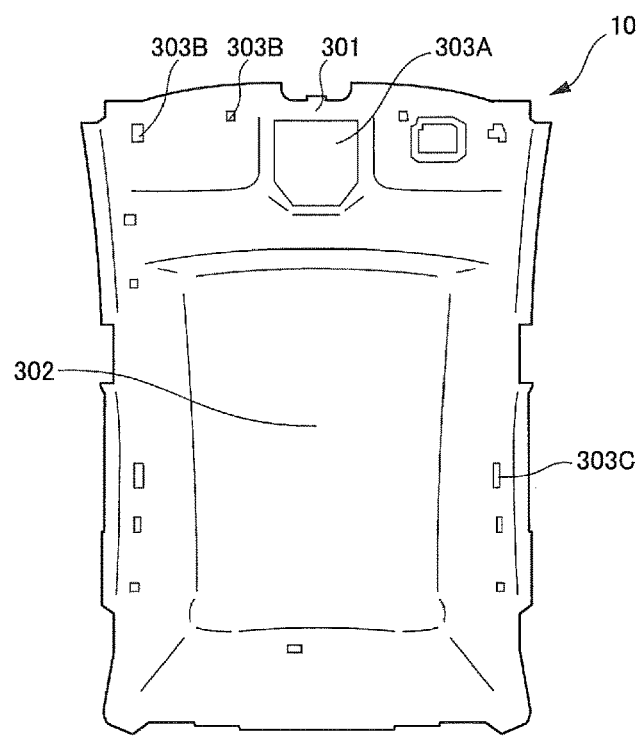
FIG. 2 is a plan view of the interior material for vehicle viewed from the direction of arrow C in FIG. 1.

As shown in FIG. 2, the interior material for vehicle 10 is substantially rectangular, when viewed nearly in a plane. FIG. 2 is a plan view of the interior material for vehicle 10 seen from the direction of arrow C in FIG. 1. A front portion 301 of the interior material for vehicle 10 is formed in a substantially planar, and a curved portion 302 is formed in a rear portion of the front portion 301 which grows higher as it goes to the center. The interior material for vehicle 10 is disposed with an opening 303A for mounting an interior light such as a room lamp or a map lamp, an opening 303B for mounting a sun visor, and an opening 303C for mounting a grip.

(1) First Embodiment

Figure 3:
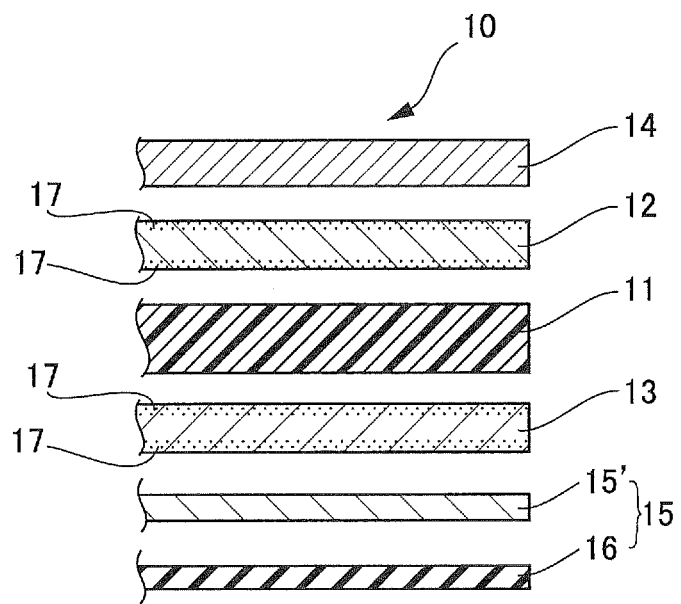
FIG. 3 is a diagram showing a layer structure of an interior material for vehicle according to a first embodiment of the present invention.

A description is made on an interior material for vehicle according to first embodiment of the present invention. FIG. 3 is a cross-sectional view of a layer structure of the interior material for vehicle 10. Corresponding to the positional relationship at a time of hot pressing, a skin layer 14 on an interior side is depicted at the top and a backside layer 15 on a vehicle body side is depicted at the bottom. As shown in FIG. 3, the interior material for vehicle 10 has a layered structure which comprises a base material layer 11, an interior side fiber layer 12 and a vehicle body side fiber layer 13 which sandwiches the base material layer 11 therebetween, a skin layer 14 which is disposed on a surface of the interior side fiber layer 12 and forms a vehicle interior roof, and a backside layer 15. The backside layer 15 comprises an infrared reflective layer 15' which is adhered to a surface of the vehicle body side fiber layer 13, and further, a protective layer 16 is formed on a surface of the infrared reflective layer 15'. In addition, an adhesive 17 is coated over both the entire front and back surfaces of each of the interior side fiber layer 12 and the vehicle body side fiber layer 13, in advance.

Here, the base material layer 11 is made of a semi-hard foam material such as an urethane foam, for example. The interior side fiber layer 12 and the vehicle body side fiber layer 13 are made of a fiber material such as a glass fiber mat. As described above, the adhesive 17 is coated over both the entire front and back surfaces of each of the interior side fiber layer 12 and the vehicle body side fiber layer 13. The interior side fiber layer 12 and the vehicle body side fiber layer 13 are reinforcement layers which reinforce the interior material for vehicle 10, while they play a role of an adhesive layer which adheres the skin layer 14 and the infrared reflective layer 15' to the side of the base material layer 11. The skin layer 14 is arbitrarily selected from breathable materials such as a nonwoven cloth, a woven cloth, knit, and the like. The infrared reflective layer 15' is composed of an aluminum deposition film and the like, and the optimum deposition film thickness is 0.03~0.09 μm. Thus, the infrared reflective layer 15' having an infrared reflecting efficiency of 80~90% can be obtained. In addition, the infrared reflective layer 15' which is configured in this manner, also has a non-breathable function, besides the function of reflecting infrared radiation. As the adhesive 17, a moisture-curable adhesive such as an isocyanate or a thermosetting resin is preferable. The skin layer 14 and the infrared reflective layer 15' are adhered by coating the adhesive 17 on both the interior side fiber layer 12 and the vehicle body side fiber layer 13, but the base material layer 11 may be coated or impregnated with the adhesive 17, alternatively. In this case, the base material layer 11 is penetrated with the coated or impregnated adhesive 17, the adhesive 17 is attached to the front surface of the interior side fiber layer 12 and the back side surface of the vehicle body side fiber layer 13. By the attached adhesive 17, the skin layer 14 is adhered to the interior side fiber layer 12, and the infrared reflective layer 15' is adhered to the vehicle body side fiber layer 13.

Figure 4:
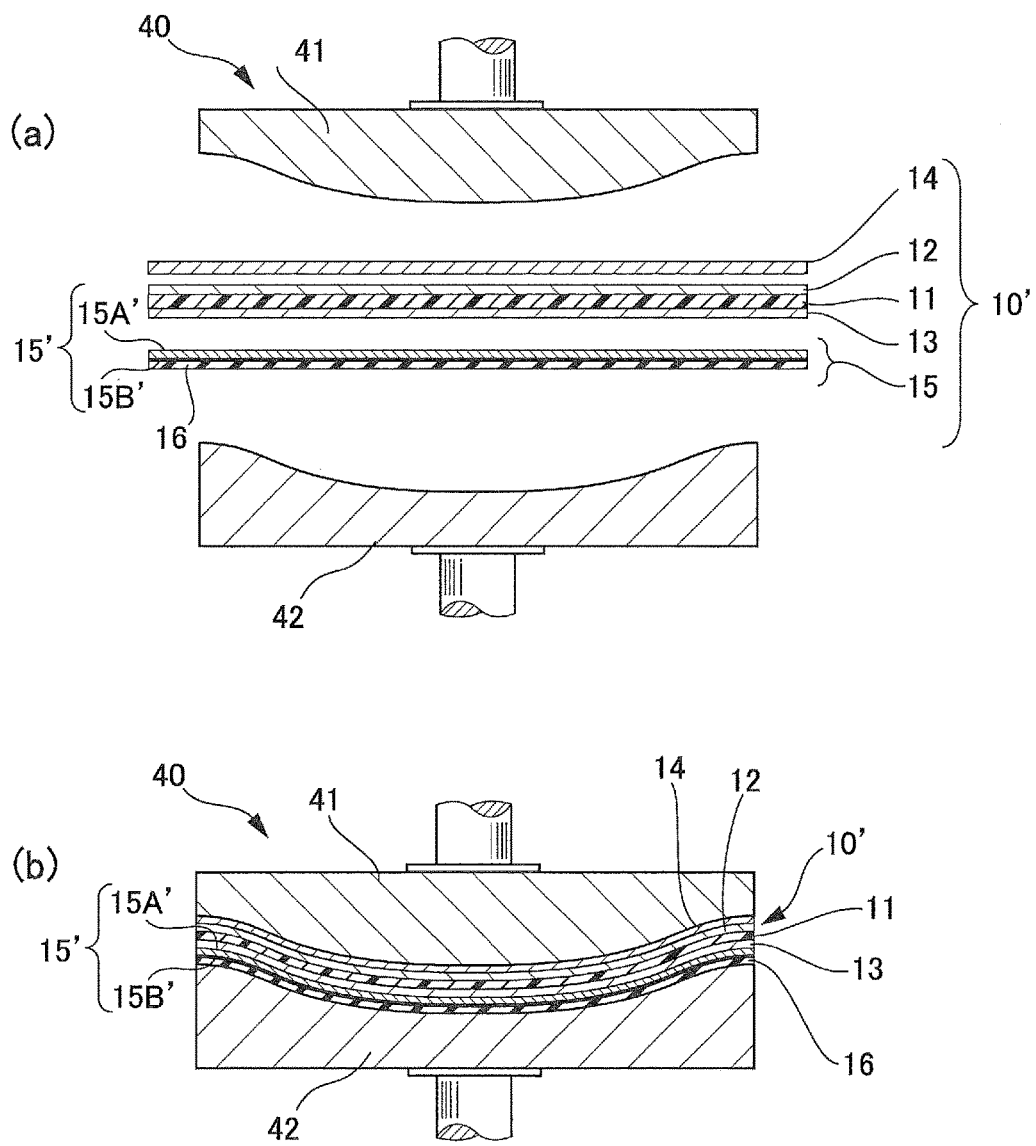
FIG. 4a and FIG. 4b are diagrams showing a manufacturing process of the interior material for vehicle according to the first embodiment of the present invention.

Next, a manufacturing process of the above described interior material for vehicle 10, referring to FIG. 4. The manufacturing process of the interior material for vehicle 10 comprises a materials preparation step for obtaining a molding material 10', and a molding step for performing a hot press molding using the molding material 10'. As shown in FIG. 4a, in the materials preparation step, a base material layer 11, an interior side fiber layer 12, a vehicle body side fiber layer 13 and a skin layer 14 are laminated, while a molding material 10 is obtained by disposing an integrated material which is laminated with a protective layer 16 on a surface to of the infrared reflective layer 15' on an opposite side to the side of the vehicle body side fiber layer 13. Here, the infrared reflective layer 15' is an aluminum deposition film which is configured by forming an aluminum deposition layer 15B', on a surface of a base film 15A'. A protective film 16 is laminated to cover the surface of the aluminum deposition layer 15B'. Then, the molding material 10' is conveyed and is set to a molding dies 40. Further, in the molding step, as shown in FIG. 4b, a hot pressing is performed at a die temperature of 130~150° C., by sandwiching the molding material 10' between an upper die 41 and a lower die 42, and clamping together the upper die 41 and the lower die 42, using the upper die 41 which molds the side of the skin layer 14 and the lower die 42 which molds the side of protective layer 16.

It is necessary to form the protective film 16 with a transparent material not to decrease the infrared reflecting efficiency of the infrared reflective layer 15', and with a good moldability material which does not adhere to the dies the temperature of which falls in a range of 130~150° C. during hot pressing. It has been found that a polyester based resin (PET) or a polypropylene based resin (PP) is preferable, for example, as a material for the protective film 16. In addition, it has been found that a thickness of the protective film 16 falls in a range of 5~25 μm. If the thickness of the protective film 16 is less than 5 μm, peeling off of the protective film 16 is likely to occur, and if the thickness of the protective film 16 is larger than 25 μm, an infrared transmittance of the protective film 16 (more than 60% is required) is deteriorated.

With regard to the interior material for vehicle 10 being configured in this manner, even if pin halls or cracks are generated on the infrared reflective layer 15' being made of an aluminum deposition film, the surface is covered with the protective film 16. Therefore, sebum, etc. attached to positions where an operator touches with his hand can be avoided from entering the pinholes or cracks, due to the existence of the protective film 16. Therefore, the decrease of adhesive strength of the aluminum deposition layer 15B' to the base film 15A' can be prevented in the environmental test, and as a result, and the infrared reflective layer 15' is hardly peeled off from the base material layer 11.

(2) Second Embodiment

Figure 5:
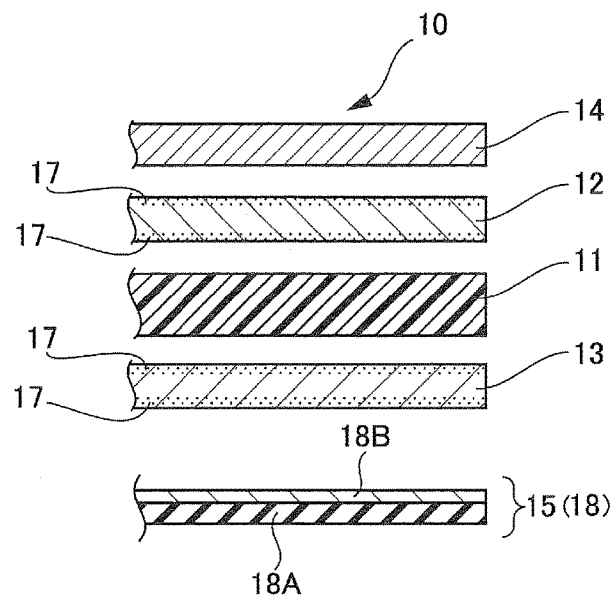
FIG. 5 is a diagram showing a layer structure of an interior material for vehicle according to a second embodiment of the present invention.

Next, a description is made on an interior material for vehicle according to second embodiment of the present invention. FIG. 5 is a cross-sectional view showing a layer structure of an interior material for vehicle 10. Corresponding to the positional relationship at a time of hot pressing, a skin layer 14 on an interior side is depicted at the top and a backside layer 15 on a vehicle body side is depicted at the bottom. As shown in FIG. 5, the interior material for vehicle 10 has a layered structure which comprises a base material layer 11, an interior side fiber layer 12 and a vehicle body side fiber layer 13 which sandwiches the base material layer 11 therebetween, a skin layer 14 which is disposed on a surface of the interior side fiber layer 12 and forms a vehicle interior roof, and a backside layer 15 which is adhered to a surface of the vehicle body side fiber layer 13.

Here, the backside layer 15 comprises a metal deposition sheet 18. The metal deposition sheet 18 is configured by a metal deposition film 18A made of aluminum, for example, which is formed on an upper surface of a resin film 18A by using an adhesive or some other treatment. A thickness of the metal deposition sheet 18 which comprises the resin film 18A and the metal deposition film 18B is set in a range of 0.8~25 μm.

For example, FIG. 6a to FIG. 6c are diagrams showing an example of a step of forming the metal deposition film 18B by depositing aluminum on the upper surface of the resin film 18A. As shown in FIG. 6a, aluminum particles (indicated by the white particles in FIG. 6a) is evaporated from aluminum evaporation source which is disposed at the bottom the resin film 18A (not shown). In this case, polar groups (indicated by the hatched particles in FIG. 6a) are produced on a surface of the resin film 18A, by applying discharge treatment. Next, as shown in FIG. 6b, the deposited aluminum particles form a columnar crystal structure (the crystal in the dotted line frame in FIG. 6a) at polar group cores. Then, as shown in FIG. 6c, the columnar crystal structure is extended to and formed on the entire surface of the resin film 18A. Through this, the metal deposition sheet 18 can be obtained in which the metal deposition film 18B is formed on the upper surface of the resin film 18A.

In this case, the metal deposition sheet 18 is not limited to those configured as shown in FIG. 6a to FIG. 6c. For example, as shown in FIG. 7, the metal deposition sheet 18 may be configured by adhering the metal deposition film 18B formed in a foil shape, on the resin film 18A, interposing an adhesive 18C.

In addition, any protective film which covers the metal deposition layer 18B is not formed with regard to the metal deposition sheet 18 used in the present invention. Without the protective film, there are generated disadvantages that the metal deposition film 18B made of aluminum easily forms aluminum hydroxide in high temperature and high humidity, and an infrared reflecting function, abrasion resistance and oil resistance are lowered. But, because the vehicle body side fiber layer 13 which is adhered to the metal deposition layer 18B and the base material layer 11 which is adhered to the vehicle body side fiber layer 13 can have the same function as that of the above mentioned protective film, it is possible to avoid the above disadvantages. In addition, returning to FIG. 5, the adhesive 17 is coated over both the entire front and back surfaces of each of the interior side fiber layer 12 and the vehicle body side fiber layer 13, in advance. Further, in FIG. 5, corresponding to the position of each layer in the manufacturing process, the skin layer 14 is disposed in an upper portion, and the metal deposition sheet 18 is disposed in a lower portion.

Here, the base material layer 11 is made of semi-hard foam material such as an urethane foam, for example. The interior side fiber layer 12 and the vehicle body side fiber layer 13 are made of a fiber material such as a glass fiber mat. As described above, the adhesive 17 is coated over both the entire front and back surfaces of each of the interior side fiber layer 12 and the vehicle body side fiber layer 13. The interior side fiber layer 12 and the vehicle body side fiber layer 13 are reinforcement layers which reinforce the interior material for vehicle 10, while they play a role of an adhesive layer which adheres the skin layer 14 and the metal deposition sheet 18 to the side of the base material layer 11. The skin layer 14 is arbitrarily selected from breathable materials such as a nonwoven cloth, a woven cloth, knit, and the like. The metal deposition layer 18B of the metal deposition sheet 18 is made of an aluminum deposition film, for example, and the optimum deposition film thickness is in a range of 0.01~0.09 μm. Thus, the metal deposition sheet 18 has an infrared reflecting function of the metal deposition layer 18B together with a non-breathable function of the resin film 18A. As the adhesive 17, a moisture-curable adhesive such as an isocyanate or a thermosetting resin is preferable. Here, the interior side fiber layer 12 and the vehicle body side fiber layer 13 may be coated or impregnated with the adhesive 17. In this case, the interior side fiber layer 12 and the vehicle body side fiber layer 13 is penetrated with the coated or impregnated adhesive 17, the adhesive 17 is attached to the front surface of the interior side fiber layer 12 and the back side surface of the vehicle body side fiber layer 13. By the attached adhesive 17, the skin layer 14 is adhered to the interior side fiber layer 12, and the metal deposition sheet 18 is adhered to the vehicle body side fiber layer 13.

Next, a manufacturing process of the interior material for vehicle 10 configured as described above is described, with reference to FIG. 4 according to the first embodiment where a similar manufacturing process is described. The manufacturing process of the interior material for vehicle 10 comprises a materials preparation step for obtaining a molding material 10', and a molding step for performing a hot press molding using the molding material 10'. As shown in FIG. 4a, in the materials preparation step, the molding material 10' is obtained by disposing a metal deposition sheet 18 instead of the base material layer 11, the interior side fiber layer 12, the vehicle body side fiber layer 13, the skin layer 14, the infrared reflective layer 15' and the protective layer 16. Then, the molding material 10' is conveyed and is set to the molding dies 40. Further, in the molding step, as shown in FIG. 4b, a hot pressing is performed by sandwiching the molding material 10' between an upper die 41 and a lower die 42, and clamping together the upper die 41 and the lower die 42, using the upper die 41 which molds the side of the skin layer 14 and the lower die 42 which molds the side of the metal deposition sheet 18 instead of the infrared reflective layer 15' and the protective layer 16. In this case, the molding material 10' is integrated by hot pressing.

The interior material for vehicle 10 is configured so that the metal deposition sheet 18 which has no protective layer is adhered to the base material layer part, taking into consideration that the base material layer part (comprising the base material layer 11, the interior side fiber layer 12, the vehicle body side fiber layer 13 and the skin layer 14) itself which is adhered to the metal deposition sheet 18 can function fully as a protective film which is formed to cover the metal deposition layer 18B of the metal deposition sheet 18. For this reason, it is unnecessary to dispose any protective film which protects the metal deposition layer 18B, in the metal deposition sheet 18. Accordingly, it is possible to reduce the number of layers of the entire interior material for vehicle 10, to shorten the so called molding cycle and to avoid the increase of the manufacturing cost.

Modification 1 of Second Embodiment

In the second embodiment, the metal deposition sheet 18 where the metal deposition layer 18B (aluminum deposition film) is adhered the surface of the resin film 18A is referred to as a ventilation stop layer, and the metal deposition sheet 18 also has a function of an infrared reflecting layer in addition to the non-breathable function. However, it is not limited to this, the metal deposition sheet 18 may be configured so as to have the non-breathable function only.

Modification 2 of Second Embodiment

In the second embodiment, a description is given referring to the interior material for vehicle as an interior material for vehicle of the present invention. However, it is not limited to this, the interior material for vehicle can be applied to an interior component of any other vehicle.

Modification 3 of Second Embodiment

In the second embodiment, a description is given that the metal deposition layer 18B of the metal deposition sheet 18 is made of an aluminum deposition film. However, it is not limited to aluminum. It is needless to say that a deposition film of at least one among copper, titanium, zinc, nickel and their oxide may be possible. In addition, it is needless to say that the metal deposition layer 18B need not be made of a deposition film, but it may be just a metal film.

As is apparent from the above description, an interior material for vehicle can be manufactured in a so called shorter molding cycle, and the increase of the manufacturing cost can be avoided, without deteriorating the infrared reflecting function, the abrasion resistance and the oil resistance, according to the interior material for vehicle of the second embodiment.

(3) Third Embodiment

Figure 8:
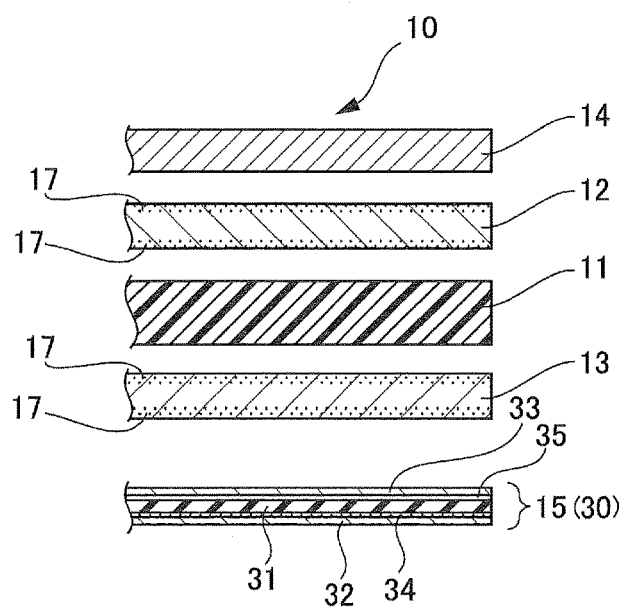
FIG. 8 is a diagram showing a layer structure of an interior material for vehicle according to a third embodiment of the present invention.

Next, a description is made on the interior material for vehicle according to the third embodiment. FIG. 8 is a cross-sectional view showing a layer structure of an interior material for vehicle 10. Corresponding to the positional relationship at a time of hot pressing, a skin layer 14 on an interior side is depicted at the top and a backside layer 15 on a vehicle body side is depicted at the bottom. As shown in FIG. 8, the interior material for vehicle 10 has a layered structure which comprises a base material layer 11, an interior side fiber layer 12 and a vehicle body side fiber layer 13 which sandwiches the base material layer 11 therebetween, a skin layer 14 which is disposed on a surface of the interior side fiber layer 12 and forms a vehicle interior roof, and a backside layer 15 which is adhered to a surface of the vehicle body side fiber layer 13. Here, the backside layer 15 comprises an aluminum deposition film 30. In the aluminum deposition film 30, an aluminum deposition layer 32, 33 is formed on each of the front and back surfaces of a base material layer 31 where the base material layer 31 and the aluminum deposition layer 32, 33 are adhered strongly by a special processing such as a corona treatment or an anchor coat for example. In FIG. 8, the layers to which the special processing was applied are indicated as a special processing layer 34, 35. Here, the base material layer 31 is made from a transparent resin such as PP, PET etc., for example, and its optimum thickness is in a range of 0.8~25 μm. Further, the optimum thickness of each of the aluminum deposition layer 32, 33 is in a range of 0.01~0.09 μm. In addition, the adhesive 17 is coated on the entire front and back surface of each of the interior side fiber layer 12 and the vehicle body side fiber layer 13, in advance.

Here, the base material layer 11 is made of semi-hard foam material such as an urethane foam, for example. The interior side fiber layer 12 and the vehicle body side fiber layer 13 are made of a fiber material such as a glass fiber mat. As described above, the adhesive 17 is coated over both the entire front and back surfaces of each of the interior side fiber layer 12 and the vehicle body side fiber layer 13. The interior side fiber layer 12 and the vehicle body side fiber layer 13 are reinforcement layers which reinforce the interior material for vehicle 10, while they play a role of an adhesive layer which adheres the skin layer 14 and the aluminum deposition film 30 to the side of the base material layer 11. The skin layer 14 is arbitrarily selected from breathable materials such as a nonwoven cloth, a woven cloth, a knit, and the like. Thus, aluminum deposition film 30 formed in this manner also has an infrared reflecting function together with a non-breathable function. As the adhesive 17, a moisture-curable adhesive such as an isocyanate or a thermosetting resin is preferable. Here, the adhesive 17 is coated to the interior side fiber layer 12 and the vehicle body side fiber layer 13, and the skin layer 14 and the aluminum deposition film 30 are adhered. Otherwise, it may be possible to penetrate the adhesive 17 coated to the base material layer 11 into the interior side fiber layer 12 and the vehicle body side fiber layer 13, and attach the adhesive 17 to the front surface of the interior side fiber layer 12 and the back side of the vehicle body side fiber layer 13, and then adhere the skin layer 14 to the interior side fiber layer 12 and adhere the aluminum deposition film 30 to the vehicle body side fiber layer 13, by the adhesive 17.

Next, a manufacturing process of the above interior material for vehicle 10 is described, referring to FIG. 4 according to the first embodiment where a similar manufacturing process is employed. The manufacturing process of the interior material for vehicle 10 comprises a materials preparation step for obtaining a molding material 10', and a molding step for performing a hot press molding using the molding material 10'. As shown in FIG. 4a, in the materials preparation step, a molding material 10 is obtained by laminating a base material layer 11, an interior side fiber layer 12, a vehicle body side fiber layer 13, a skin layer 14, and an aluminum deposition film 30 instead of the infrared reflective layer 15' and the protective layer 16. Then, the molding material 10' is conveyed and is set to a molding dies 40. Further, in the molding step, as shown in FIG. 4b, a hot pressing is performed at a die temperature of 130~150° C., by sandwiching the molding material 10' between an upper die 41 and a lower die 42, and clamping together the upper die 41 and the lower die 42, using the upper die 41 which molds the side of the skin layer 14 and the lower die 42 which molds the side of the aluminum deposition film 30 instead of the infrared reflective layer 15' and the protective layer 16. In addition, the aluminum deposition film 30 includes a layer 35 interposed between the base material film 31 and the aluminum deposition layer 33, and a special processing layer 34 which is interposed between the base material film 31 and the aluminum deposition layer 32.

Figure 9:
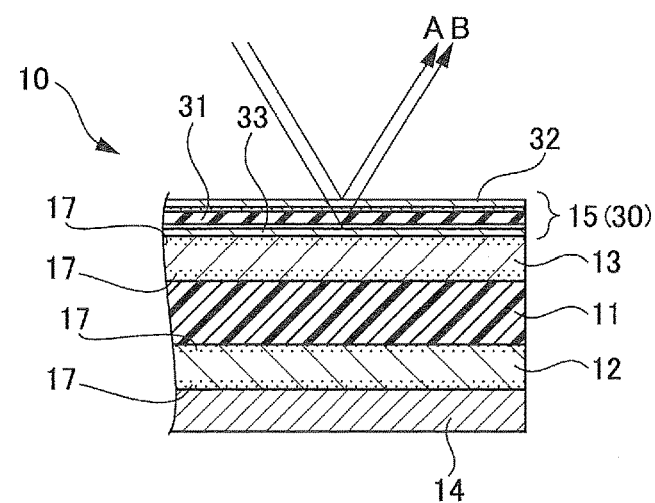
FIG. 9 is a diagram showing an optical path of the incident and reflected infrared ray on the interior material for vehicle according to the third embodiment of the present invention.

FIG. 9 is a cross-sectional view of the interior material for vehicle 10 formed as described above, where the aluminum deposition film 30 is shown at the top position. In FIG. 9, the arrow A indicates an optical path through which an infrared ray incidents and reflects on the aluminum deposition layer 33 of the aluminum deposition film 30.

The aluminum deposition layer 32 of the aluminum deposition film 30 cannot be free from progressing of its hydroxylation by being exposed to the outside air, but it is possible to suppress deterioration of an infrared reflectance by the hydroxylation to down about 30%, and to keep the infrared reflectance at about 60%. Further, in the aluminum deposition layer 33 of the aluminum deposition film 30, hydroxylation proceeds in a range of about 10% of the entire surface area, by penetration of water from the skin layer 14, the interior side fiber layer 12, the base material layer 11, the vehicle body side fiber layer 13 and the like, but it is possible to keep the infrared reflectance of the aluminum deposition layer 33 at about 60%.

Figure 10:
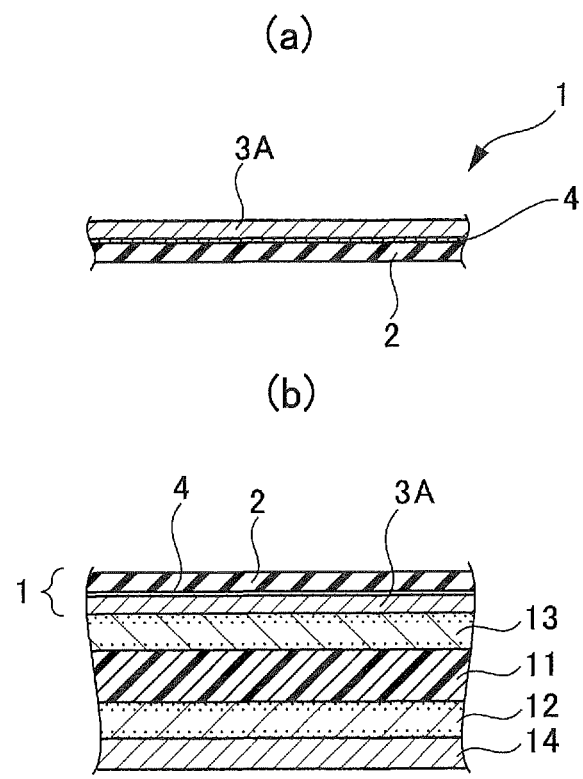
FIG. 10 is a diagram showing a comparative example to the third embodiment.

Therefore, by forming the aluminum deposition layer 32 on the front surface of the aluminum deposition film 30, and forming the aluminum deposition layer 33 on the back surface of the aluminum deposition film 30, the infrared reflectance of the aluminum deposition film 30 is significantly improved as compared to the configuration for a comparative example, in which an aluminum deposition film 1 is formed with an aluminum deposition layer 3A on a base film 2 made of a resin through a special processing layer 4, shown in FIG. 10a and FIG. 10b.

As is apparent from the above description, according to the interior material for vehicle of the third embodiment, a relatively inexpensive aluminum deposition film having an aluminum deposition layer on each of the front and back surfaces of a transparent base film can be used for the aluminum deposition film. With regard to the interior material for vehicle which incorporates such an aluminum deposition film, one of the aluminum deposition layers formed on each of the front and back surfaces of the base film can be adhered to the vehicle body side fiber layer 13, and good moldability is disposed by the configuration.

In addition, hydroxylation proceeds in one aluminum deposition layer adhered to the vehicle body side fiber layer 13 proceeds by penetration of water from the vehicle body side fiber layer 13 and the like, and hydroxylation also proceeds in the other aluminum deposition layer which is exposed to the outside air. But because the aluminum deposition film is equipped with two infrared reflective layers, an interior material for vehicle having a higher infrared reflectance can be obtained using the aluminum deposition film, as compared to either configuration of FIG. 10b.

Modification 4 of Third Embodiment

In the third embodiment, the interior side fiber layer 12 is adhered to the front surface of the base material layer 11, and the vehicle body side fiber layer 13 is adhered to the back surface of the base material layer 11. However, it is not necessary to configure from. It is needless to say that the interior side fiber layer 12 and the vehicle body side fiber layer 13 may be made of other material such as a resin, for example, instead of a fiber layer.

Modification 5 of Third Embodiment

In the third embodiment, an aluminum deposition film is used as the infrared ray reflective layer. However, it is needless to say that the deposition layer is not limited to aluminum, and the deposition layer can be made of other metal such as chromium.

(4) Fourth Embodiment

Figure 11:
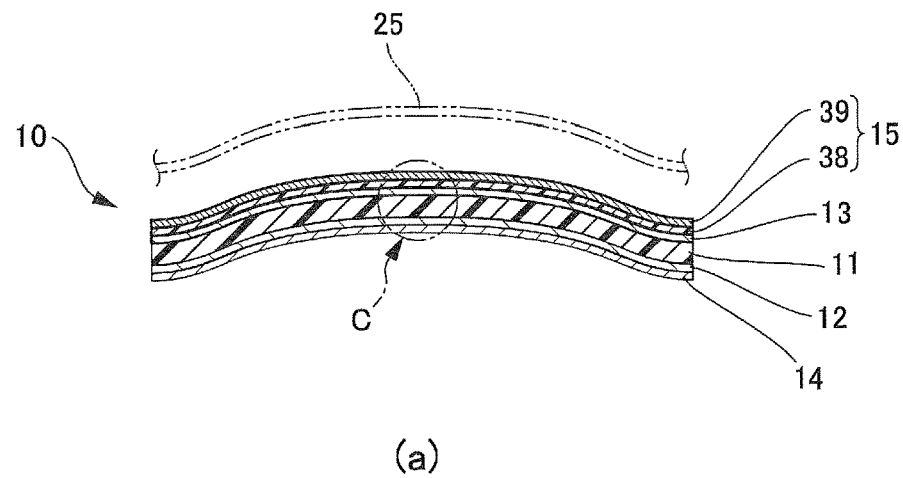
FIG. 11a and FIG. 11b are diagrams showing a layer structure of an interior material for vehicle according to a fourth embodiment of the present invention.
Figure 11:
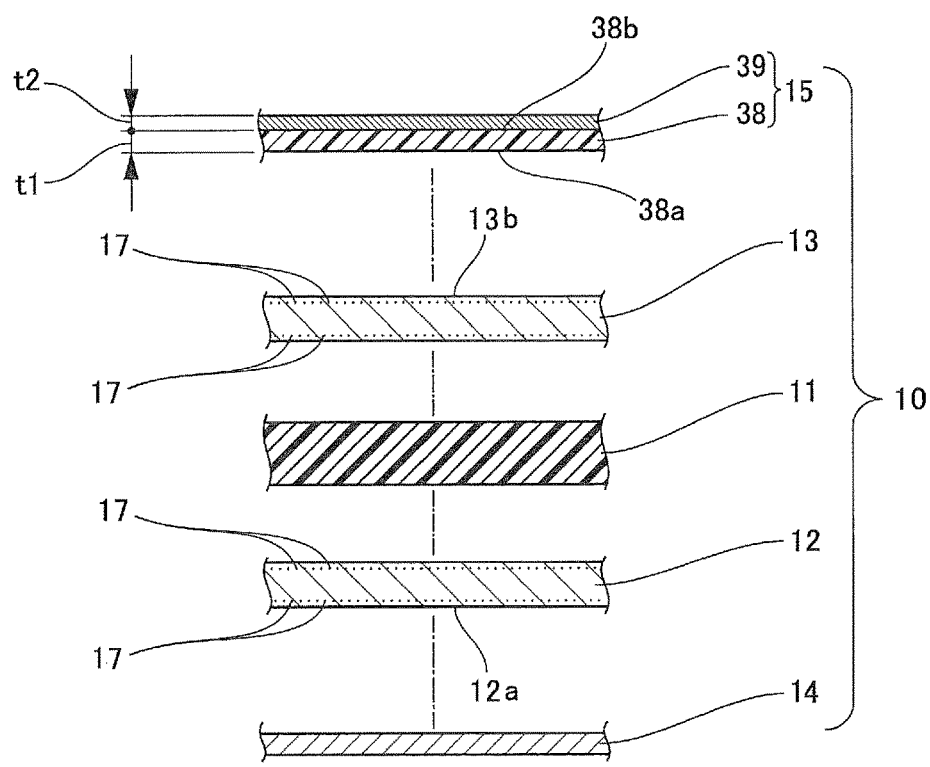

Next, a description is made on an interior material for vehicle according to fourth embodiment of the present invention. FIG. 11a and FIG. 11b show cross-sectional views of a layer structure of the interior material for vehicle 10. Corresponding to the positional relationship at a time of mounting it to a vehicle body, a backside layer 15 on a vehicle body side is depicted at the top, and a skin layer 14 on an interior side is depicted at the bottom. As shown in FIG. 11a and FIG. 11b, the interior material for vehicle 10 comprises a base material layer 11, a reinforcement interior side fiber layer 12 and a vehicle body side fiber layer 13 which are disposed to sandwich the base material layer 11, a skin layer 14 which is disposed on a front surface 12a of the interior side fiber layer 12 (refer to FIG. 1) and which forms a roof surface, and a backside layer 15 which is disposed on a back surface 13b of the vehicle body side fiber layer 13.

The base material layer 11 is made of semi-hard foam material such as an urethane foam, for example. The skin layer 14 is arbitrarily selected from breathable materials such as a nonwoven cloth, a woven cloth, a knit, and the like. The interior side fiber layer 12 and the vehicle body side fiber layer 13 are made of a fiber material such as a glass fiber mat. The entire front and back surfaces of the interior side fiber layer 12 and the vehicle body side fiber layer 13 are coated with an adhesive 17, and they become a reinforcement layer which reinforces the interior material for vehicle 10, while they function as an adhesive layer which adheres the skin layer 14 and the backside layer 15 to a side of the base material layer 11. As the adhesive 17, a moisture-curable adhesive such as an isocyanate or a thermosetting resin is preferable.

Here, the skin layer 14 and the backside layer 15 are adhered by coating the adhesive 17 on the vehicle body side fiber layer 13 and the interior side fiber layer 12, but a method for adhering each of the layers of the interior material for vehicle 10 can be selected from any adhesive means, without being limited particularly by the above method. The base material layer 11 may be coated or impregnated with the adhesive 17, for example. The base material layer 11 is penetrated with the coated or impregnated adhesive 17, and then the adhesive 17 is attached to the front surface 12a of the interior side fiber layer 12 and the back surface 13b of the vehicle body side fiber layer 13. By the attached adhesive 17, the skin layer 14 is adhered to the interior side fiber layer 12, and the backside layer 15 is adhered to the vehicle body side fiber layer 13.

The backside layer 14 comprises a base layer 38 which is disposed to a side of the base material layer 11, and an infrared reflective layer 39 which is disposed to a side of a roof 25 (a heat source side) of a base layer 38. The reason why it is effective to dispose the infrared reflective layer 39 to the heat source side of the base layer 38 shall be described later.

The base layer 38 is a ventilation stopping layer which blocks an air flow in the thickness direction of the interior material for vehicle 10, and which prevents dust from adhering to the surface of the skin layer 14. The base layer 38 is composed of a non-breathable film being made of a synthetic resin such as a polypropylene base resin, a polyester base resin. It is preferable to set a thickness t1 of the base layer 38 in a range of 0.8~25 μm.

An infrared ray reflective layer 39 has a thickness t2 in a range of 0.01~0.09 μm, and is made of an inorganic material which has an optical reflectance over 80% in a wavelength range of 4000~26000 nm. Such an infrared ray reflective layer 39 can be selected from various inorganic reflective substances such as a metal film (an aluminum deposition film, for example) or a metal foil (an aluminum foil, for example) which is deposited on a back surface 38b of the base layer 38.

In a case where the infrared ray reflective layer 39 is composed of an aluminum deposition film, it is preferable to form the aluminum deposition film on the base layer 38 which is a base film made of a synthetic resin, and adhere strongly the base film (the base layer 38) and the aluminum deposition film (the infrared ray reflective layer 39) by a special processing such as a corona treatment or an anchor coat for example. In addition, a layer made of an inorganic material such as an aluminum deposition film is preferable as the infrared ray reflective layer 39, because it absorbs an ultra violet ray, a visible light and infrared ray very little.

Here, an example of a method of manufacturing the interior material for vehicle 10 is described with reference to FIG. 4 according to the first embodiment where a similar manufacturing process is employed. Note that in FIG. 4, corresponding to the direction of the molding material 10', the skin layer 14 is disposed at the top and the backside layer 15 is disposed at the bottom.

The manufacturing process of the interior material for vehicle 10 comprises a materials preparation step for obtaining the molding material 10', and a molding step for performing a hot press molding using the molding material 10'.

As shown in FIG. 4a, in the materials preparation step, the molding material 10' is obtained by laminating a base material layer 11, an interior side fiber layer 12, a vehicle body side fiber layer 13, a skin layer 14, the infrared reflective layer 15' and a backside layer 15. Then, the molding material 10' is conveyed and is set to the molding dies 40. Further, in the molding step, as shown in FIG. 4b, using an upper die 41 which molds a side of the skin layer 14 and a lower die 42 which molds a side of the backside layer 15, a hot pressing is performed at a die temperature of 130~150° C. by clamping together the upper die 41 and the lower die 42, and sandwiching the molding material 10' between the upper die 41 and the lower die 42. Thus, an interior material for vehicle 10 having a predetermined shape can be obtained where the layers are laminated.

Experimental Example

Next, a description is made on an experimental example performed for studying an optimum configuration of the infrared reflective layer 39 of the interior material for vehicle 10 with reference to FIG. 12 to FIG. 15.

Figure 12:
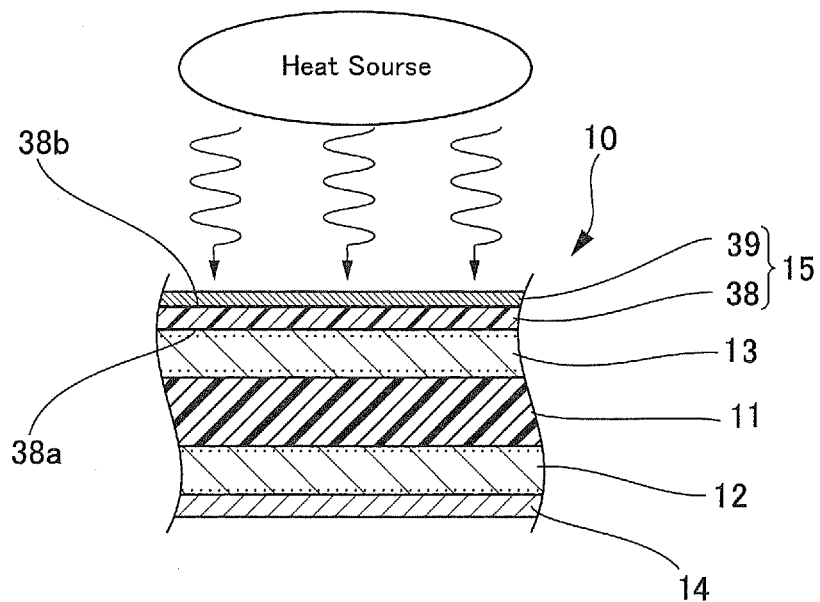
FIG. 12 is a cross-sectional view of a test product used in an experiment as the interior material for vehicle according to the fourth embodiment of the present invention.
Figure 13:
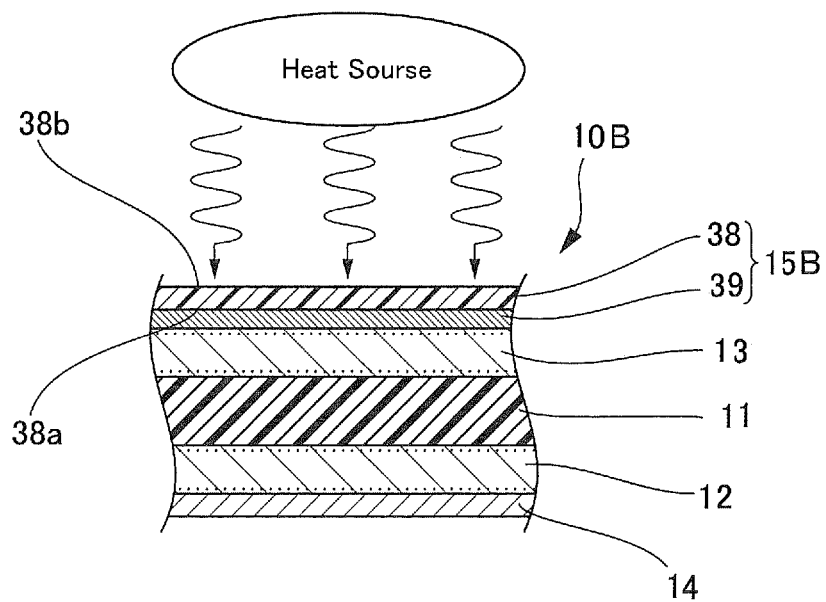
FIG. 13 is a cross-sectional view of a reference product used in the experiment.
Figure 14:
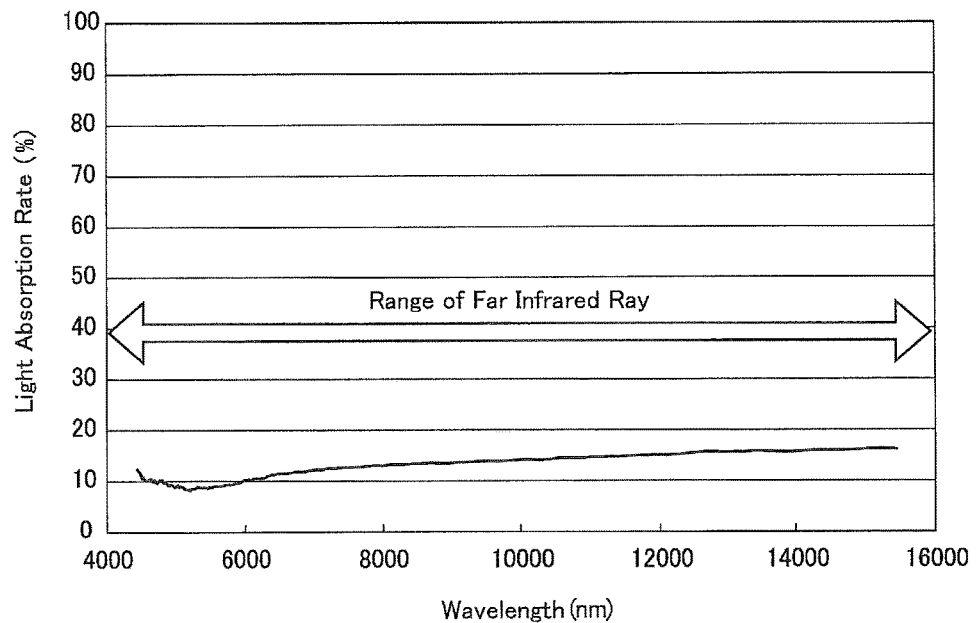
FIG. 14 is a diagram showing a relationship between wavelength and light absorption rate in the test product as the interior material for vehicle according to the fourth embodiment of the present invention.
Figure 15:
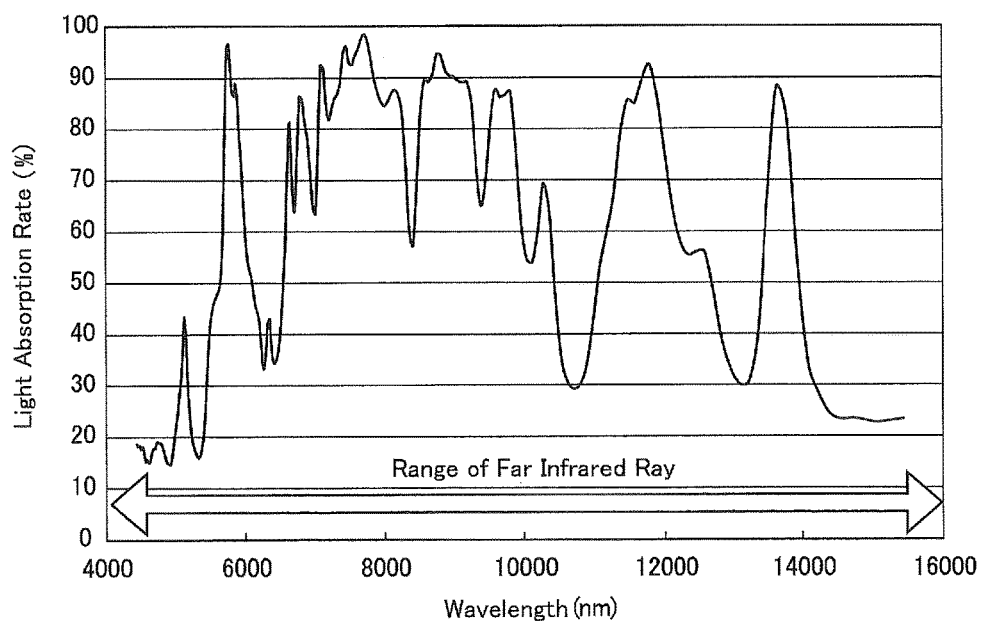
FIG. 15 is a diagram showing a relationship between wavelength and light absorption rate in the reference product in the experiment.

FIG. 12 is a cross-sectional view of a test specimen used in the experiment, and FIG. 13 is a cross-sectional view of a reference specimen used in the experiment. FIG. 14 is a diagram showing a relationship between a wavelength and a light absorption rate of the test specimen. FIG. 15 is a diagram showing a relationship between wavelength and light absorption rate in the reference product. In addition, the present invention is not limited to the experimental example.
(Specimen)

The interior material for vehicle 10 (refer to FIG. 12) of the fourth embodiment was used as the test specimen. The interior material for vehicle 10B (refer to FIG. 13) was used as the reference specimen.

Figure 6:
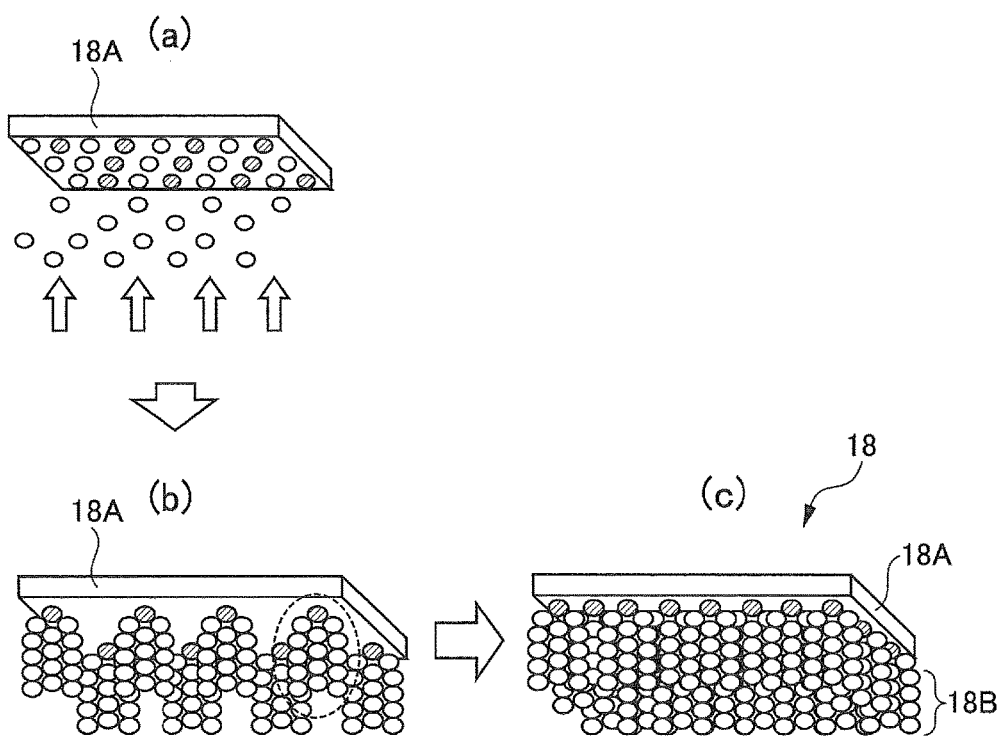
FIG. 6a to FIG. 6c are diagrams showing an example of the steps of the manufacturing process of the metal deposition sheet applied to the interior material for vehicle according to the second embodiment of the present invention.
Figure 7:
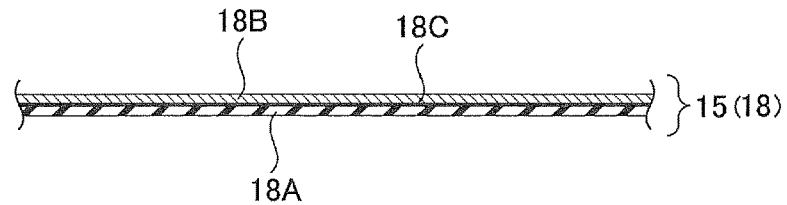
FIG. 7 is a diagram showing a modification of the layer structure of the interior material for vehicle according to the second embodiment of the present invention.

As shown in FIG. 6, the reference specimen has a layer structure where the front surface and the back surface of the backside layer 15 (refer to FIG. 12) is inverted in the interior material for vehicle 10 (refer to FIG. 12). In the backside layer 15B of the interior material for vehicle 10B, the infrared ray reflective layer 39 is disposed on a front surface 38a of the base layer 38, and a back surface 38b of the base layer 38 is the most back surface.
(Experimental Method)

As shown in FIG. 12 and FIG. 13, an far infrared ray having a wavelength of 4000~16000 nm was radiated from a side of the backside layer 15, 15B, using a heat source, to each of the interior material for vehicle 10 of the test specimen and the interior material for vehicle 10B of the reference specimen, and the light absorption rate was measured.
(Experimental Result)

Experimental results are shown in FIG. 14 and FIG. 15. The interior material for vehicle 10 of the test specimen showed the stable low light absorption rate less than 20% in the entire range of 4000~16000 nm as shown in FIG. 14. On the other hand, the interior material for vehicle 10B of the test specimen showed the high light absorption rate in the range of 4000~16000 nm, regardless of a heat shielding effect of the infrared ray reflective layer 39, as shown in FIG.

15. This may be attributed to a heat generation due to molecule vibration caused by the far infrared ray radiation, in the base layer 38 disposed to the side of the heat source (corresponding to a side of the roof 25 shown in FIG. 1). That is, it can be said that a heating element (the base layer 38) rides on the infrared reflective layer 39, in the reference specimen. Accordingly, it was confirmed that the heat shielding performance is not sufficiently given by the infrared reflective layer 39, in a layer structure where the base layer 38 is disposed to the side of the heating source.

By the above experimental result, it was confirmed that the best configuration for maximizing the heat shielding performance of the infrared reflective layer 39 with preventing heat generation in the base layer 38 was to dispose the infrared reflective layer 39 to the side of the heat source (corresponding to a side of the roof 25 shown in FIG. 1), and in the interior material for vehicle 10 of the reference specimen being configured in this manner, a light reflectance more than 80% was obtained in a wavelength range of 4000~16000 nm.

As a result, in order to enhance the light reflectance to the far infrared ray radiation in the backside layer, it was found that it was effective to dispose the infrared reflective layer to the side of the vehicle body (the side of the heat source). On the other hand, the performance of the infrared reflective layer itself is not changed, even if the infrared reflective layer is disposed to the inside of the base layer (the side of the base material layer), instead of the side of the vehicle body (the side of the heat source). However, in this case, if a far infrared ray of a wavelength in a range of 4000~16000 nm is radiated, heat generates due to molecule vibration in the base layer made of a synthetic resin, for example. In this circumstance, the heat shielding performance of the infrared ray reflective layer cannot be used fully and the temperature increase in the vehicle interior cannot be suppressed effectively.

In this regard, in the fourth embodiment, because the infrared reflective layer disposed is disposed on the side of the vehicle body panel (the side of the heat source), heat generation in the base layer is prevented. As a result, it is possible to maximize the heat shielding performance of the infrared reflective layer having a light reflectance more than 80% in the wavelength range of 4000~16000 nm, and to suppress a temperature increase in the vehicle interior more effectively.

Therefore, according to the interior material for vehicle 10 of the fourth embodiment, a temperature rise in the vehicle interior 24 can be suppressed more effectively, by disposing optimally the infrared reflective layer 39 for the infrared ray radiation.

A description has been made on the fourth embodiment as above. It may be apparent to those skilled in the art that it is possible to add various changes or modifications to the fourth embodiment, without departing from the scope thereof.

For example, in the fourth embodiment, an example is shown that the interior side fiber layer 12 is disposed on the front surface of the base material layer 11, and the vehicle body side fiber layer 13 is disposed on the back surface of the base material layer 11. However, as far as the interior material for vehicle which comprises a base material layer, a skin layer being disposed to an interior side of the base material layer, and a backside layer being disposed to a side of the vehicle body of the base material layer is concerned, any layer structure of the interior material for vehicle can be employed.

(5) Fifth Embodiment

Figure 18:
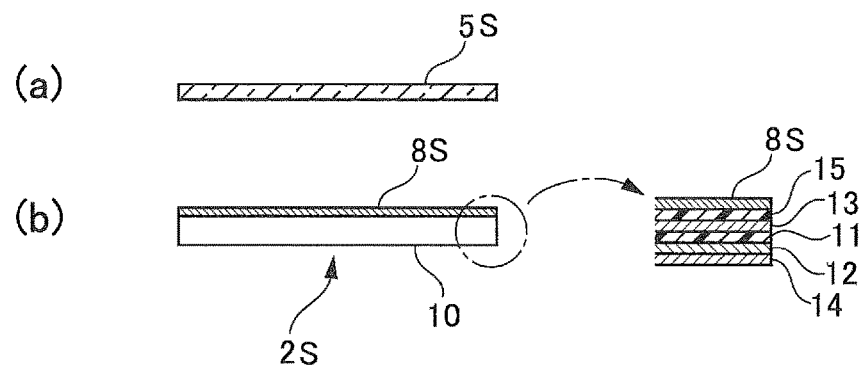
FIG. 18a is a schematic cross-sectional view of a heat insulating smoked glass which is attached to the sunroof in the vehicle interior of FIG. 16.
FIG. 18b is a schematic cross-sectional view of the sunshade for the vehicle sunroof which is attached in the vehicle interior of FIG. 16.
Figure 19:
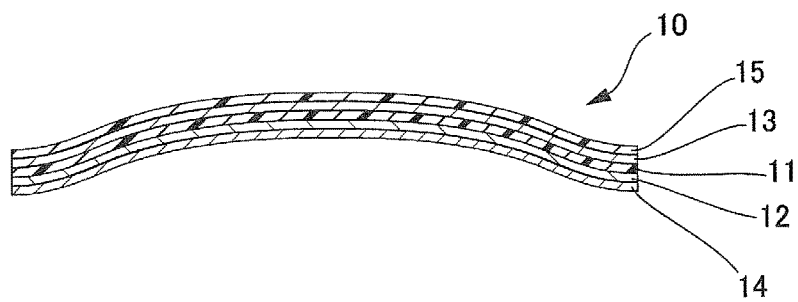
FIG. 19 is a diagram showing an example of a layer structure of a conventional interior material for vehicle.
Figure 20:
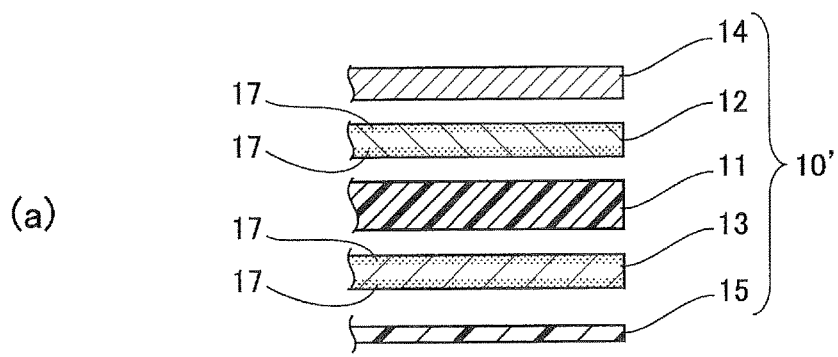
FIG. 20a and FIG. 20b are diagrams showing an example of a manufacturing process of the conventional interior material for vehicle.
Figure 20:
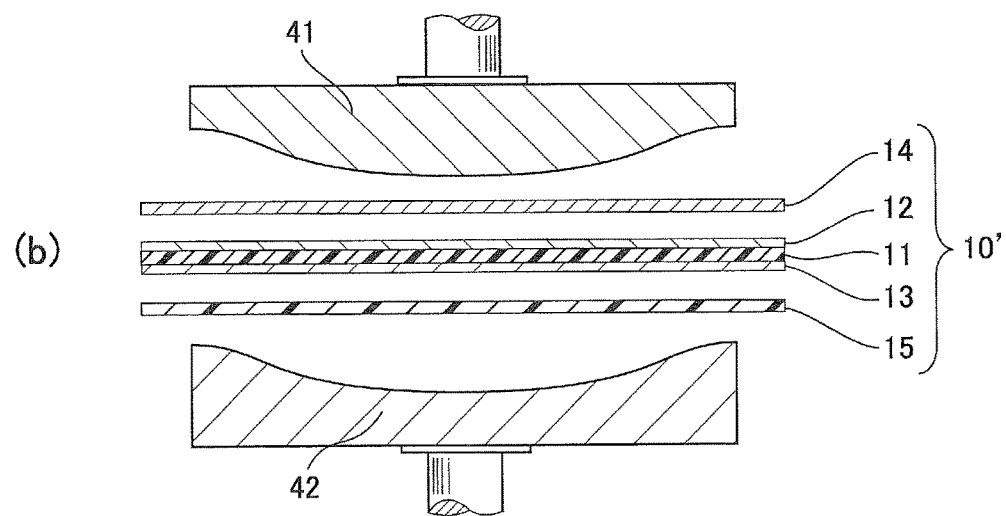

Finally, a description is made on an interior material for vehicle of the fifth embodiment according to the present invention. FIG. 18 is a cross-sectional view of a layer structure of the interior material for vehicle 10. Corresponding to a positional relationship when being mounted to a vehicle body, a backside layer 15 on a vehicle side 15 is depicted at the top, and a skin layer 14 on a vehicle interior side is depicted on bottom.

Figure 16:
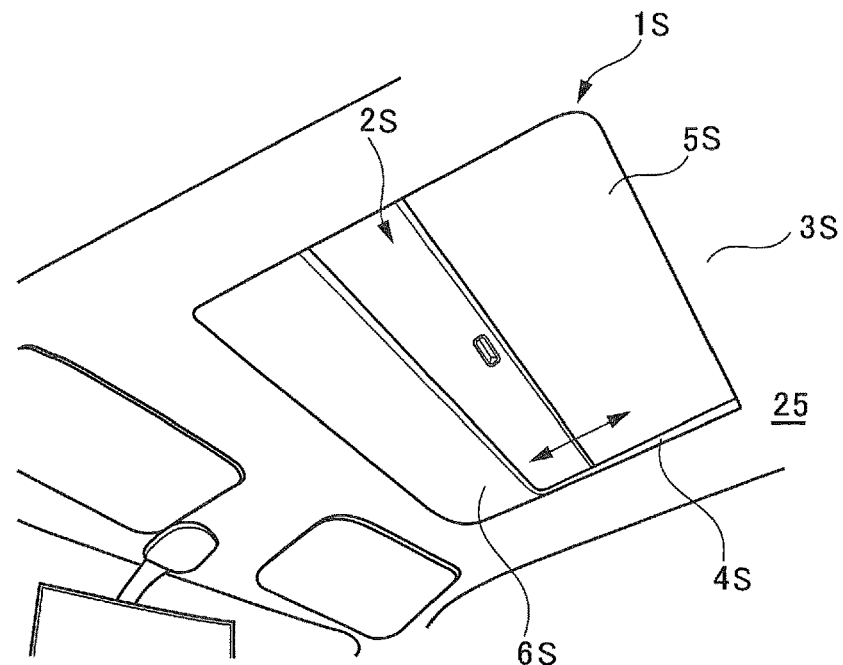
FIG. 16 is an outer perspective view of a roof of a vehicle interior where an interior material for vehicle according to a fifth embodiment of the present invention is applied as a sunshade for a vehicle sunroof.

Here, before describing FIG. 18, a description is made on a relative relationship between a sunroof and a sunshade. FIG. 16 shows a roof 25 in a vehicle interior which comprises a sunroof 1S, and a sunshade 2S for a vehicle sunroof being disposed together with the sunroof 1S. The roof 25 is composed of a roof trim 3S which covers a vehicle panel (described later) forming a vehicle interior 24. Though a detailed illustration and a detailed description are omitted with regard to the roof trim 3S, it can be made of a already known structure. That is, the roof trim 3S is configured, using a base material layer made of an urethane for example, an interior side fiber layer and a vehicle body side fiber layer which sandwich the base material layer, a skin layer which forms a roof surface of a vehicle interior being disposed on a surface of the interior side fiber layer, a ventilation stop layer which faces a backside surface of the vehicle body side fiber layer or a vehicle body side. In addition, it is preferable to dispose a suitable heat shield member on a surface of the roof trim 3S facing the side of the vehicle panel, because it gives a heat shield effect on the entire roof part of the vehicle interior together with a sunshade 2S described later.

A sunroof 1S is configured by fitting a transparent member 5S (preferably a heat ray blocking transparent member 5S) into an opening 4S formed in a rectangular shape in a center portion of the roof 25. In addition, the heat ray blocking transparent member 5S is mounted to the opening 4S which is a sunroof without steps (refer to FIG. 17).

Figure 17:
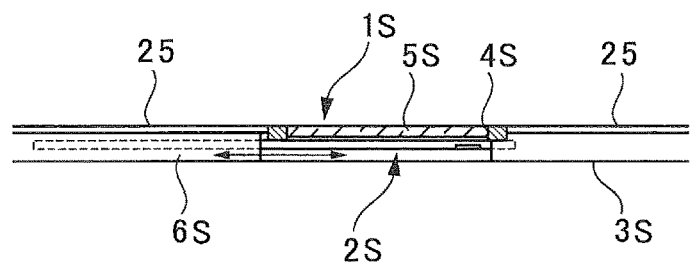
FIG. 17 is a schematic cross-sectional view of the vehicle sunroof and the sunshade therefor on the roof of the vehicle interior of FIG. 16.

Next, a description is made on a sunshade 2S. The sunshade 2S is disposed slidably so that it is pulled out from a housing unit 6S being disposed between the central portion of the roof 25 and a front portion of the vehicle, and it covers the opening 4S of the sunroof 1S in the central portion of the roof 25 from the side of the vehicle interior. Then, as shown in FIG. 17 and FIG. 18b, the sunshade 2S comprises the base material layer 11 having an area corresponding to the sunroof 1S, and a heat shield member 8S which is laminated to a surface of the base material layer 11 in the side of the sunroof 1S, and reflects the radiant heat from the sunroof 1S. The heat shield member 8S is made of aluminum as described in detail later.

As the heat ray blocking transparent member 5S, a material having a heat absorbing ability and a visible light transmitting ability, or a so called heat blocking smoked glass, that is a UV cut glass having excellent heat blocking ability and a high heat absorbing ability, is the most preferable (refer to FIG. 18a).

Further, in the sunshade 2S, the base material layer 11 having an area corresponding to the sunroof 1S, comprises the same composing materials as those of the roof trim 3S. That is, the base material layer 11 comprises, in the same manner as those of the roof trim 3S as described above, the base material layer made of an urethane, the interior side fiber layer 12 and the vehicle body side fiber layer 13 which sandwich the base material layer 11, the skin layer which forms the roof surface of the vehicle interior being disposed on a surface of the interior side fiber layer 12, and the ventilation stop layer which faces a backside surface of the vehicle body side fiber layer 13 or a side of the heat shield member. And the heat shield member 8S being laminated on the surface of the base material layer 11 in the side of the sunroof 1S is an aluminum deposition film which is configured by depositing aluminum as an aluminum material on a surface of a resin film such as a polypropylene terephthalate (PPT) or a polyethylene terephthalate (PET), for example. Of course, it is possible to laminate an aluminum foil or an aluminum sheet on a resin film, besides using the aluminum deposition film.

In addition, it is preferable to use the aluminum foil instead of the aluminum deposition film which is configured by depositing aluminum as the heat shield member 8S, because the aluminum material is relatively inexpensive and it is known that the aluminum material has an excellent high reflectance for the radiant heat radiated from an object at a temperature in a range of room temperature to 200° C., that is, the aluminum material has a relatively low absorption rate for the radiant heat.

The description has been made as above on the sunshade 2S for the vehicle sunroof according to the present invention, and hereafter, a description is made on the function and effect of the heat shield.

In summer time, especially in a fine weather, the vehicle body 21 of an entire vehicle is heated to a high temperature by the radiant heat under direct sunlight. Especially, the temperature of the roof 25 grows high considerably. Then, the heat ray blocking transparent member 5S in the sunroof 1S is exposed to direct sunlight as well as the surrounding vehicle body 21. However, the heat can be blocked somewhat, due to the heat absorbing ability of the heat ray blocking transparent member 5S. Nevertheless, the heat cannot be blocked completely under the direct sunlight in summer time, the heat ray blocking transparent member 5S is heated up somewhat, and the temperature grows high.

However, because the heat shield member 8S of the base material layer 11 in the sunshade 2S is brought to the position facing the heat ray blocking transparent member 5S of the sunroof 1S, since the opening 4S on which the heat ray blocking transparent member 5S is mounted is covered by the sunshade 2S being pulled out from the housing unit 6S, from the side of the vehicle body, the radiant heat from the heated up heat ray blocking transparent member 5S can be reflected effectively by the heat shield member 8S of the base material layer 11. In this case, the aluminum deposition film is used as the heat shield member 8S. When an aluminum foil is used in the same manner, it is convenient as the heat shield member 8S, because the aluminum material is relatively inexpensive, and has an excellent high reflectance for the radiant heat radiated from an object at a temperature in a range of room temperature to 200° C. In addition, as described above, by using the roof trim 3S around the sunroof 1S to which a heat shield measure is applied, a heat shield effect can be expected as a whole in the heat shield member 8S of the base material layer 11 in the sunshade 2S, and so the livability in the vehicle interior 24 of the vehicle can be improved more effectively.

Accordingly, even if the temperature of the sunroof grows high by the radiant heat of the sunlight, the radiant heat can be reflected by the aluminum material which is the heat shield member on the base material layer in the sunshade facing the sunroof, and is not accumulated in the sunshade, and the temperature control efficiency in the vehicle interior is not decreased.

The present invention has been described using the embodiments 1-5 and their several variations. It is needless to say that the technical scope of the present invention is not limited to the embodiments described above. It is apparent to those skilled in the art that various changes or modifications can be added to the embodiments described above. Further, it is apparent from the description of the scope of the claims that the embodiments of the various changes or modifications are also included in the technical scope of the present invention.

REFERENCE SIGNS LIST

1 . . . aluminum deposition film, 2 . . . resin film, 3 . . . adhesive, 3A . . . aluminum deposition layer, 4 . . . special processing layer, 5 . . . adhesive, 10 . . . interior material for vehicle, 10'. molding material, 11 . . . base material layer, 12 . . . interior side fiber layer, 13 . . . vehicle body side fiber layer, 14 . . . skin layer, 15 . . . backside layer, 16 . . . protective layer, 17 . . . adhesive, 18 . . . metal deposition sheet, 18A . . . resin film, 18B . . . metal deposition film, 20 . . . vehicle, 21 . . . vehicle body, 22 . . . front wheel, 23 . . . rear wheel, 24 . . . vehicle interior, 25 . . . roof, 30 . . . aluminum deposition film, 31 . . . base material layer, 32, 33 . . . aluminum deposition layer, 301 . . . front portion, 302 . . . curved portion, 303A, 303B, 303C . . . opening, 38 . . . base layer, 39 . . . infrared reflective layer, 40 . . . molding dies, 41 . . . upper die, 42 . . . lower die, t1 . . . thickness of base layer 38, t2 . . . thickness of infrared reflective layer 39, 1S . . . sunroof, 2S . . . sunshade, 3S . . . roof trim, 4S . . . opening, 5S . . . heat ray blocking transparent member, 6S . . . housing unit, 8S . . . heat shield member

CITATION LIST

Patent Literature

Patent Literature 1: Japanese Patent Application Laid-Open Publication No. 2001-158306
Patent Literature 2: Japanese Patent Application Laid-Open Publication No. 2010-208607

The invention claimed is:
1. An interior material for a vehicle, comprising:
a base material layer;
a first reinforcement layer disposed on a surface of a vehicle interior side of the base material layer;
a second reinforcement layer disposed on a surface of a vehicle body side of the base material layer;
a skin layer disposed on a surface of the opposite side of the first reinforcement layer viewed from the base material layer; and
a backside layer disposed on a surface of the opposite side of the second reinforcement layer viewed from the base material layer,
wherein the backside layer comprises a resin film and a metal deposition film deposited on the resin film, the metal deposition film is directly adhered via a moisture-curable adhesive to the second reinforcement layer.
2. The interior material according to claim 1, wherein the resin film comprises at least one of a polyester-based resin (PP) and a polypropylene-based resin (PET).
3. The interior material according to claim 1, wherein the metal deposition film comprises an aluminum deposited on the resin film or an aluminum foil laminated on the resin film.
4. The interior material according to claim 1, wherein the resin film has a thickness in a range of 0.8~25 μm.

5. The interior material according to claim 1, wherein the metal deposition film has a thickness in a range of 0.01~0.09 µm.

6. The interior material according to claim 1, wherein the metal deposition film has a light reflectance of 80% or more in a wavelength region of 4000~16000 nm.

7. The interior material according to claim 1, wherein the backside layer comprises one metal deposition film, the resin film and an other metal deposition film in this order viewed from the second reinforcement layer.

8. The interior material according to claim 7, wherein the resin film has a thickness in a range of 0.8~25 µm.

* * * * *